United States Patent [19]

Siahou

[11] 4,341,230
[45] Jul. 27, 1982

[54] SOUND-PRODUCING TOOTHBRUSH ASSEMBLY

[76] Inventor: Joseph Siahou, 14, rue Pascal, 13007 Marseille, France

[21] Appl. No.: 200,266

[22] Filed: Oct. 24, 1980

[30] Foreign Application Priority Data

Oct. 31, 1979 [FR] France ............................. 79 27399

[51] Int. Cl.³ ........................................... A45D 44/18
[52] U.S. Cl. ................................................. 132/84 B
[58] Field of Search ..................................... 132/84 R

[56] References Cited

U.S. PATENT DOCUMENTS

| | | | |
|---|---|---|---|
| 2,877,477 | 3/1959 | Levin | 15/105 |
| 2,947,013 | 8/1960 | Silverman | 15/105 |
| 3,002,798 | 10/1961 | Corley | 132/84 R |
| 3,859,684 | 1/1975 | Moskwinski | 15/23 |
| 3,998,234 | 12/1976 | Stubbmann | 132/84 R |
| 4,001,909 | 1/1977 | Erickson et al. | 15/105 |

FOREIGN PATENT DOCUMENTS

| | | |
|---|---|---|
| 909688 | 4/1954 | Fed. Rep. of Germany . |
| 7342778 | 3/1974 | Fed. Rep. of Germany . |
| 1484982 | 5/1967 | France . |
| 23441 | of 1912 | United Kingdom . |

*Primary Examiner*—G. E. McNeill
*Attorney, Agent, or Firm*—Sandler & Greenblum

[57] ABSTRACT

A sound-generating toothbrush adapted to increase the efficiency of toothbrushing as well as to direct the functional senses for cleaning from top to bottom with translational pressure and for bringing about a desired psychological effect as well as a desired utility. The device comprises a container including a sound-producing system; and is adapted to receive a toothbrush or like instrument therein.

9 Claims, 2 Drawing Figures

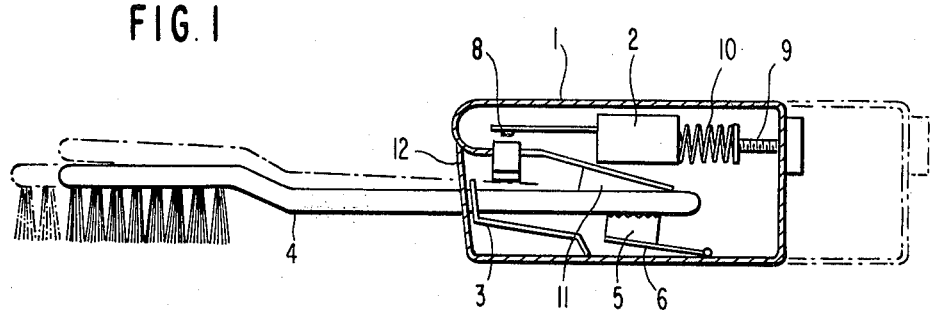
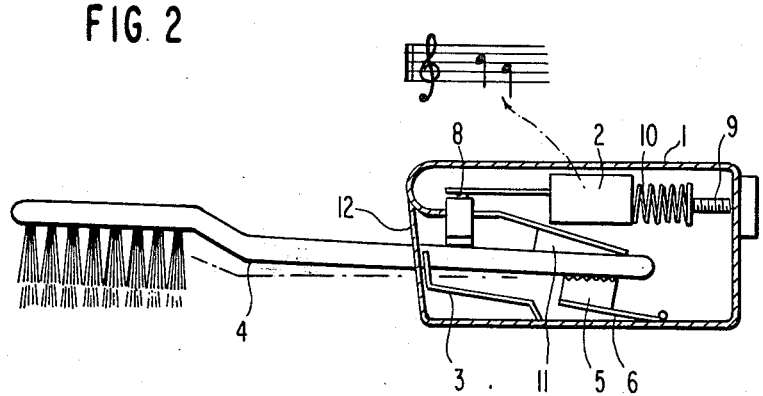

SOUND-PRODUCING TOOTHBRUSH ASSEMBLY

BACKGROUND OF THE INVENTION

The invention relates to a toothbrush assembly having a music generating means.

SUMMARY OF THE INVENTION

It is an object of the invention to provide a sound generating toothbrush apparatus which functions as a toothbrush while generating sounds such as musical sounds.

Dental hygiene is important beginning at a very young age. However, it is often very difficult to ensure that children as young as four years old continue to brush their teeth for the necessary length of time. Normally, the minimum recommended period for a good brushing is about three minutes.

It is an object of this invention to provide a device comprising two conjugate apparatus placed in one another. The device comprises a sound generating apparatus which generates either musical melodies or sounds or comical notes which is adapted to be incorporated within the handle of a toothbrush.

A container which holds a portion of the handle of the toothbrush serves as a handle and the device operates to generate sounds when brushing begins and stops when the child has stopped brushing. This makes it possible to monitor the fact that the child is indeed brushing. Furthermore, according to the invention, the sound generating means may be set to continue so as to correspond to the desired brushing time of the child and the child can be taught that he is to continue brushing until he hears no more music being generated and that if he stops before this time his brushing is incomplete.

The recorded melody or the song generated can be changed so as to prevent the routine from becoming uninteresting and boring and to minimize the boredom of the mechanical act. Thus, the sounds being generated or songs can be changed so as to correspond to a different song for each day.

The child or adult for that matter will enjoy the act of brushing their teeth by virtue of the sounds which accompany this act which can even serve to set the rhythm of the brushing. To those with an aversion to the use of a toothbrush, the simple fact of distracting their attention can help them to overcome this problem.

The device may also be used by dentists. The child will be distracted from fearing the potential pain that may result from the operations being performed by superimposing the musical sounds in his mind. The toothbrush may be substituted by operating instruments. This daily exercise may well resolve the temporal spatial orientation problems which are often the cause of reading and writing difficulties or the impossibility of associating sounds to graphical movements. It is thus a means for conditioning the child for his or her dental hygiene. Also, the association between the brushing movement will improve the child's self-control. Furthermore, differences in the color of the brush, associated to specific music, can also be educational for the child and in this sense a system in learning classification operations which are indispensable to his intellectual development. The device is designed by taking into account color which assists in developing the child's perceptions; sound, which assists in developing hearing; the duration of the sound which assists in developing a temporal appreciation in the child; and movement which assists the child in learning action. The association of these four parameters tends to enhance the intellectual development associated with achieving regular and harmonious hygiene with this sound-producing toothbrush.

The device finds particular use in conjunction with the work performed by speech specialists in education or rehabilitation as well as in the treatment of psychological problems.

The invention has a further object a container having a sound-producing system incorporated therein, the container of the shape and design of the container being adapted to receive a toothbrush or other dental instrument therein.

BRIEF DESCRIPTION OF THE DRAWINGS

Reference is made to the annexed drawings given by way of non-limiting example only:

FIG. 1 illustrates the toothbrush incorporated in the container and ready for use;

FIG. 2 illustrates the toothbrush in operation.

DESCRIPTION OF OPERATION

The container 1 provided with its sound system 2 receives the handle of toothbrush 4 in its jaw 3 and it is held at its end by a grip 5 mounted on spring 6 and a retention plate 11 of a guide 12. This arrangement makes it possible for the toothbrush to be moveable in the up and down direction and by pressure on the teeth during use to press against the contact button 8 which activates the sound system 2 which may be either mechanical or electrical.

The duration of the music can be predetermined as a function of the desired toothbrushing time.

The sound-generating apparatus may be wound up by a winding screw 9 which tensions a spring 10. The operation should be apparent from the above description.

As may be seen from FIG. 2, when in use, the handle of the toothbrush 4 presses against the contact button 8 which activates the sound generating means. It is, therefore, possible to verify from a distance that the child has brushed long enough.

The sound-generating apparatus, as was noted above, may be either mechanical or electrical. When a mechanical sound-generating apparatus is used, this apparatus may be wound as indicated. Quite obviously, it is unnecessary to wind up an electrical sound-generating apparatus. Nevertheless, when using an electrical sound-generating apparatus, a winder may be used for purposes of acting as a timer which breaks contact when a preselected amount of brushing time has expired.

Although the invention has been described with respect to particular apparatus and means, it is to be understood that the invention is limited to those means particularly disclosed but extends to all equivalents falling within the scope of the claims.

What is claimed is:

1. A sound-generating toothbrush container adapted for holding a toothbrush during toothbrushing to encourage and increase the efficiency of toothbrushing as well as to direct the functional senses for cleaning from top to bottom with translational pressure and for bringing a desired psychological effect, said toothbrush container comprising:

(a) a sound producing system; and (b) means for receiving a toothbrush or like instrument therein during use, said means for receiving said toothbrush being adapted to pressure said toothbrush in response to pressure exerted by said toothbrush during brushing whereby sound is produced upon application to the teeth of said toothbrush and stops upon removal of the toothbrush from the teeth.

2. The device as defined by claim 1 wherein said means for receiving a toothbrush comprises jaws adapted to receive said toothbrush therein.

3. The device as defined by claim 2 further comprising gripping means mounted on a spring means and a retention plate adapted to hold the handle of said toothbrush therein.

4. The device as defined by claim 3 in combination with a toothbrush having a handle inserted in said container.

5. The device as defined by claim 4 wherein the end of said handle comprises a guide adapted to assure the desired vertical motion to said toothbrush.

6. The device as defined by claim 5 further comprising a contact button adapted to activate said sound-producing means when said toothbrush is pressed against the teeth and in use.

7. The device as defined by claim 6 further comprising a winding screw adapted to wind up said sound-producing means, said winding screw being operatively associated with said sound-producing means by means of spring.

8. The device as defined by claim 6 wherein said sound-producing means is electrical.

9. The device as defined by claim 1 wherein said sound-producing means produces music.

* * * * *